A. S. HARVEY.
ROTARY ENGINE.
APPLICATION FILED APR. 21, 1915.

1,261,927.

Patented Apr. 9, 1918.
4 SHEETS—SHEET 1.

WITNESSES
Edw Dale
Geo. M. Hickey

INVENTOR
ALEXANDER S. HARVEY
Walter V. Keene
ATTORNEY

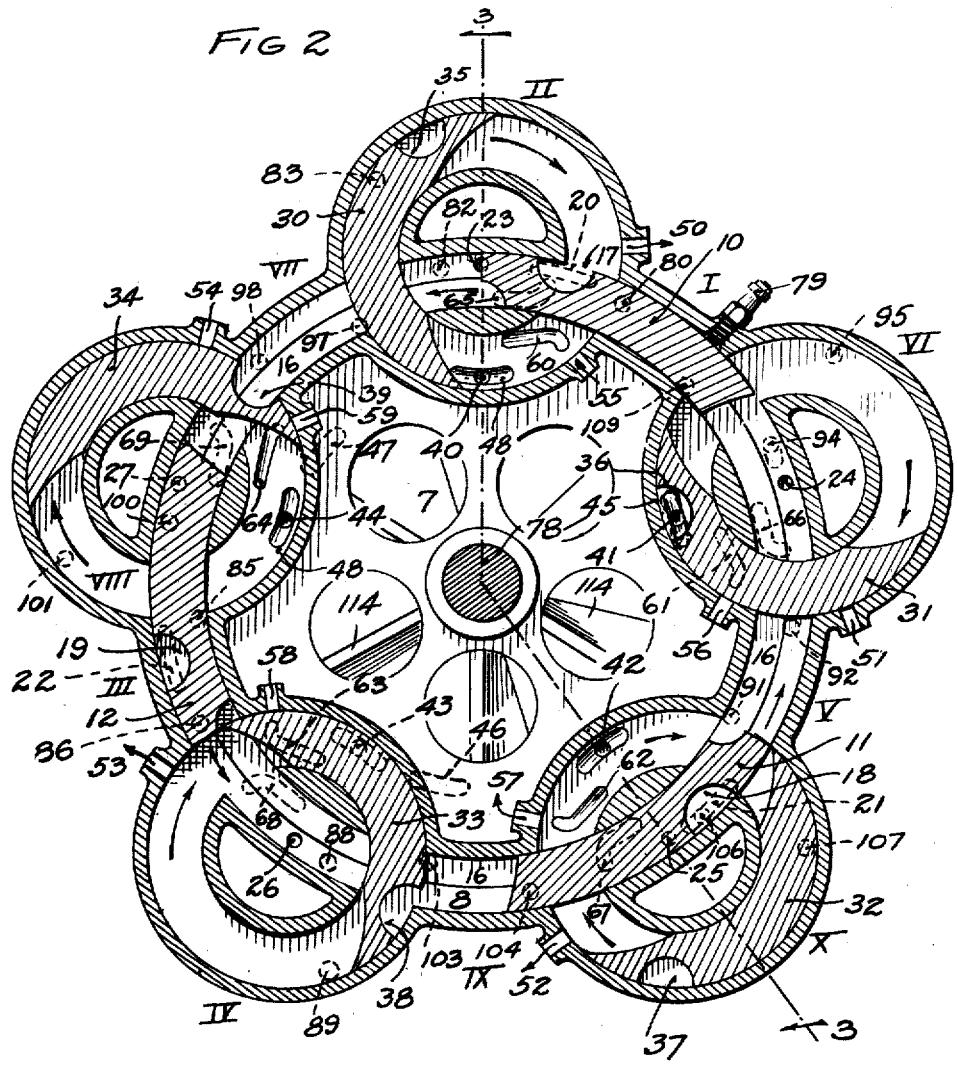

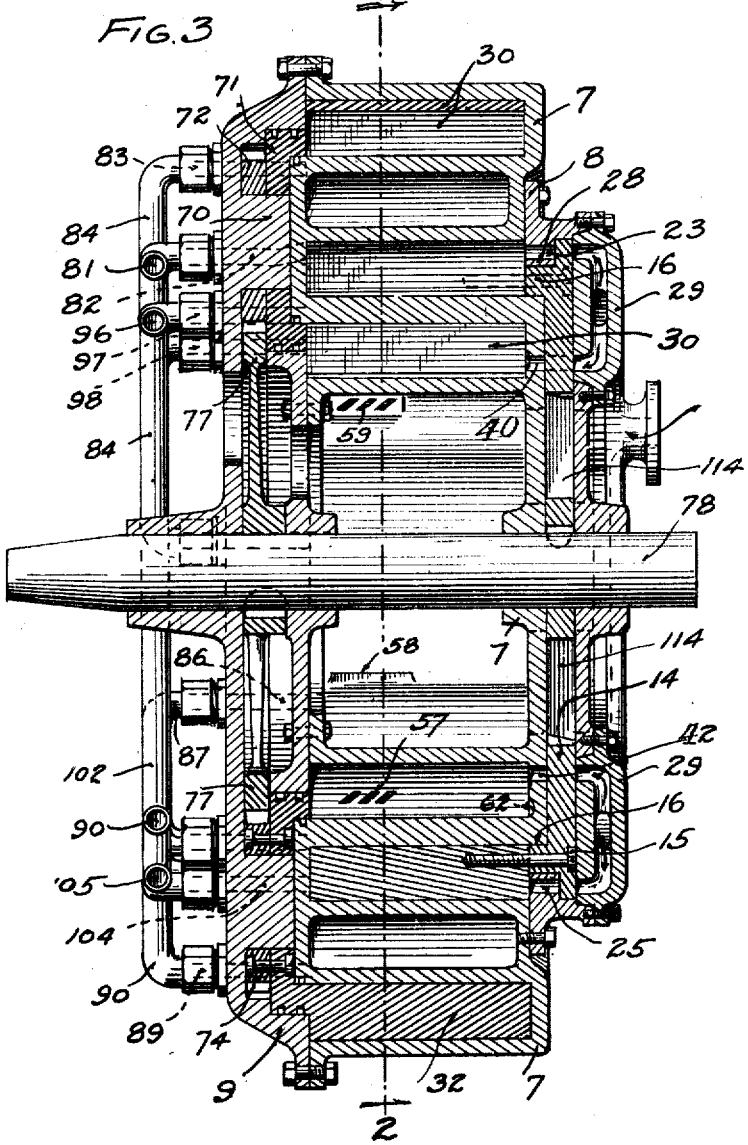

A. S. HARVEY.
ROTARY ENGINE.
APPLICATION FILED APR. 21, 1915.
1,261,927.
Patented Apr. 9, 1918.
4 SHEETS—SHEET 4.
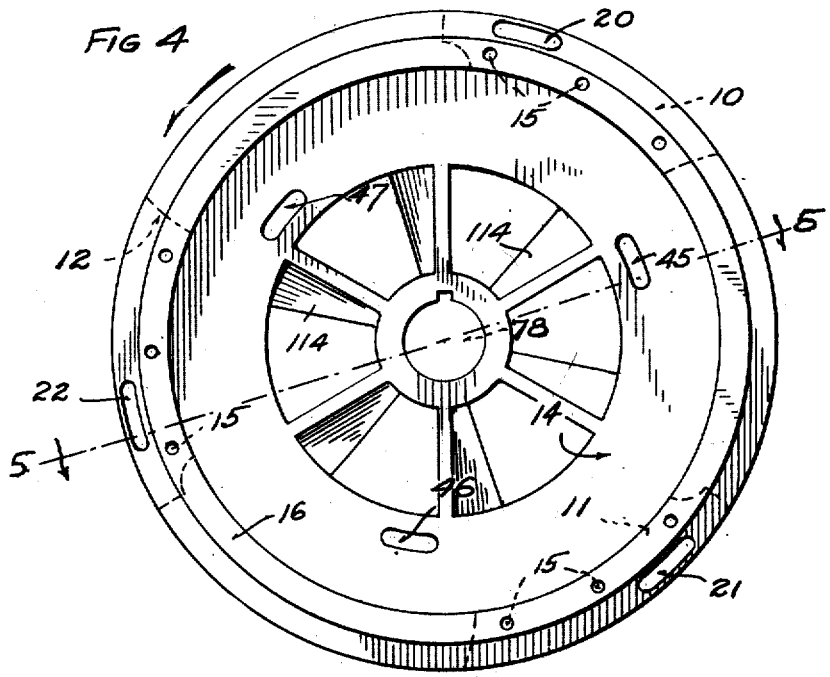
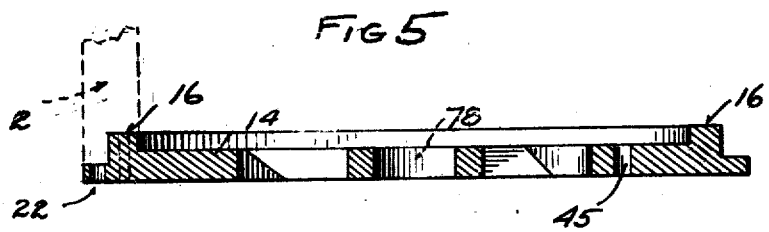
WITNESSES
Edw Dales
Geo. McHickey
INVENTOR
ALEXANDER S HARVEY
BY Walter V. Keene
ATTORNEY

UNITED STATES PATENT OFFICE.

ALEXANDER S. HARVEY, OF LOS ANGELES, CALIFORNIA.

ROTARY ENGINE.

1,261,927.  Specification of Letters Patent.  Patented Apr. 9, 1918.

Application filed April 21, 1915. Serial No. 22,737.

*To all whom it may concern:*

Be it known that I, ALEXANDER S. HARVEY, a citizen of the United States, residing at Los Angeles, in the county of Los Angeles and State of California, have invented a new and useful Improvement in Rotary Engines, of which the following is a specification.

This invention relates to engines and more particularly to engines of the rotary type and the principal object is to provide an efficient rotary prime mover.

It is also an object to provide a rotary prime mover with a plurality of intersecting and intercrossing segments acting as pistons traveling in annular channels acting as inclosing cylinders.

It is also an object to provide a rotary prime mover with means to introduce and control an expandible fluid medium between a pair of the segments or pistons to react against one to cause movement in the other.

It is a further object to provide a rotary prime mover with means to revolve the intercrossing segments in unison to accomplish the results enumerated.

It is a further object to provide a rotary prime mover with a plurality of intersecting and intercrossing channels in which the intercrossing and interlocking piston segments travel.

It is also an object to provide a rotary engine with means to deliver an expandible charge of gas to pockets formed in said segments to be released within the expandible chambers in said channels.

It is a further object to provide a channel in a rotary engine with a plurality of traveling segments acting as pistons within said channel with one or more intercrossing channels each having one or more piston segments, that together with the first mentioned segments alternately act as abutments for each other.

It is a still further object to provide an internal combustion engine with means whereby a portion of the ignited charge in one combustion chamber will be conveyed to another chamber of the same character and explode the explosive charge therein.

In the drawings accompanying this invention—

Fig. 2 is a section parallel with the plane shown in Fig. 1 and on the line 2—2 of Fig. 3.

Fig. 3 is a section on the line 3—3 of Figs. 1 and 2.

Fig. 4 is an elevation of the ported disk viewed from the inner side and Fig. 5 is a section on the line 5—5 of Fig. 4 the location of the segment 12 being shown in dotted lines.

Figure 1:
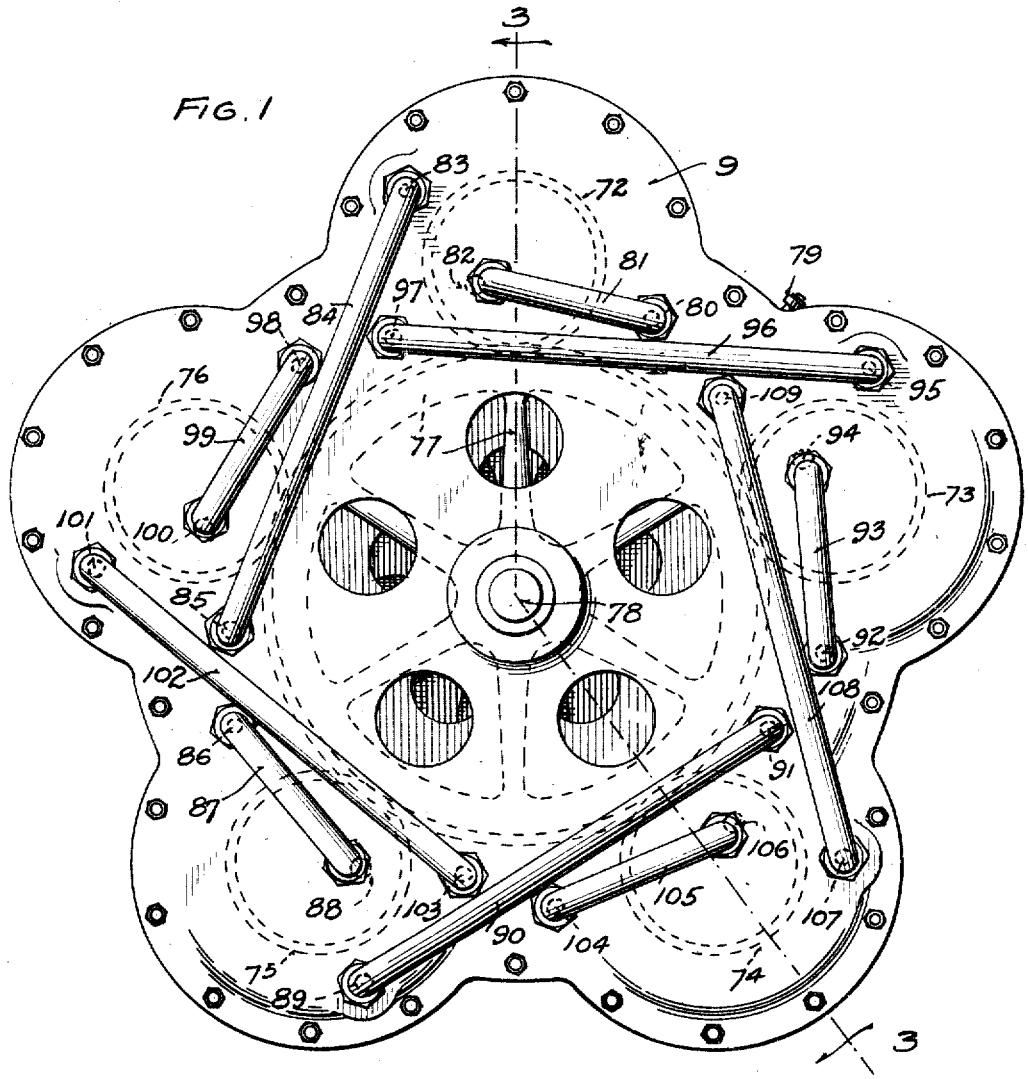
Figure 1 is an elevation from the side upon which the pipes or channels for carrying the ignited gases from one chamber to another are located.

Heretofore in rotary engines it has been common to intersect pistons in various planes but never to cross and recross the path or channels in which the pistons travel in the same plane of rotation and by this means enable them to alternately form an abutment or be themselves impelled by the action of an expandible medium.

Heretofore in the operation of internal combustion engines the use of a continuously operating igniting system has been necessary, together with expensive connections to various parts of the engine. This invention overcomes the above objections and provides a means in which the initially exploded charge or part thereof is carried in a suitable channel to the next to-be-exploded charge, allowing the disconnecting and non use of the initial igniter.

More specifically in the drawings numeral 7 designates the main section of the engine casing having the annular channels therein, to which is secured by suitable fastenings the intake cover or closure 8, and a closure 9 on the opposite side which closes the smaller annular channels opening on this side, while the large annular channel opens oppositely and is closed by the closure 8, which may be split or otherwise formed to accommodate the valved disk described later.

The large channel as shown is divided into five expansion chambers by the closure and the five segments or pistons inclosed and adapted to revolve in the smaller channels and each of which as shown also constituting an expansion or explosion chamber.

To clearly identify the action of each of these segments in their respective channels, each will be separately numbered there being three segments 10, 11 and 12 fitted within the main channel and secured to the ported valve disk 14 adapted to revolve between the ported casing 7 and the closure 8, any suitable fastenings as the screws 15 rigidly holding the piston segments to the disk as stated.

These pistons entirely fill the cross sectional area of the channel, extending inwardly from the disk 14, the forward or leading faces being cut away for a portion of their inner edge, while the rear or impulse ends are preferably cut at an angle to the radial line. The inlet disk 14 though of as large diameter as the outer periphery of the large channel, only closes the inner half of the channel, the annular shoulder 16 closing the opening and forming the seat for the segments 10 11 and 12, each of these segments having a charge receiving and delivering pocket 17, 18 and 19 extending from one side to the other on the outer periphery of the segments, there being a port in the intake disk 14 opposite each one of these pockets numbered 20 21 and 22.

These ports 20 21 and 22 in the rim of the disk are adapted to register with the ports 23 24 25 26 and 27 located in the stationary flange 28 of the closure 8 and shown as closing the other portion of the channel for the segments 10 to 12.

The ports 23 to 27 extend outwardly from their registering location to connect with one portion of the intake manifold 29 which in turn is connected to a suitable source of fluid under pressure, this engine being adapted to be used with expandible fluid as well as explosive mixtures. This manifold may be of any desired shape and is shown as composed of an annular chamber having five connections to the closure 8, a portion of the inner face contacting with the disk 14.

The five smaller intersecting and intercrossing channels shown are of the same width and preferably of the same cross sectional area as the large channel, are each provided with a segment preferably of larger size or extending over a greater arc than those in the main channel, the smaller pistons numbered 30 to 34 inclusive occupy approximately one half the channel and are each provided with a charge pocket 35, 36, 37, 38 and 39 respectively which are adapted to register with the intake ports 40, 41, 42, 43 and 44 in the casing 7, three ports 45, 46, and 47 being arranged to register therewith successively, these latter being formed in the disk 14 and affording communication with the inner portions of the intake manifold 29 previously described.

The inner ends of the ports 40 to 44 are preferably provided with short channels or grooves 48, one for each port, cut in the casing and extending on either side of the port, to permit the pockets to entirely fill as the pockets pass these ports more rapidly than the other segments pass their inlet ports.

No exhausts are required or shown connected directly with the larger channel but ports numbered 50 to 54 inclusive act as outlets for exhaust and spent gases from each of the adjoining chambers, while ports 55 to 59 allow of the passage of gases and air in either direction, depending upon the movement of the adjacent segments, these latter ports opening into the interior of the casing 7, and these together with those opening outwardly are not shown connected with a manifold since the pressure is so slight that muffling would not be necessary.

Adjacent to the openings or ports 55 to 59 are a series of relief or by-pass grooves, 60 to 64 formed on the inner portion of the smaller channels and on the intake side. On the opposite side similar grooves are cut or formed in the casing 7 between the intersection of the two portions of each of the smaller channels, and designated 65 to 69 inclusive.

The casing cover 9 is provided with five hubs 70 on which revolve the annular flanged support 71, one each for each of the five segments 30 to 34, the segment being shown as cast integral with the support, which in turn has secured to its opposite and outer face, the gear wheels 72 to 76 whose pitch diameter is one-third the pitch diameter of the large gear 77 concentrically mounted and keyed on the concentric shaft 78, concentric to the large annular channel.

These gears mesh with one another and therefore revolve in the relation of one to three, the peripheral speeds of the segments revolving in the relation of four of the large to five of the smaller.

Taking the engine as for internal combustion purposes, and starting from the spark plug 79 inserted in the casing 7 adjacent that portion of the main channel marked "I", then in this portion in the direction indicated by the arrow is a port 80 that is connected by a tubular connection 81 to a port 82 also in the large channel. The next port in order of firing is port 83 in chamber II connected by channel or tube 84 with port 85 in chamber III. This communicates through main channel to port 86, through tube 87 to port 88, and from latter to port 89 tube 90 to port 91 and through main channel to port 92, then through tube 93 to port 94 and from port 94 to port 95 in channel VI. From port 95 through tube 96 to port 97, then port 98 through tube 99 to port 100 in main channel to port 101 in chamber VIII through tube 102 to port 103, along main channel forming chamber IX to port 104 tube 105 to port 106 and to port 107 in channel X through tube 108 to port 109, the point of beginning in explosion or expansion chamber "I".

This in itself is the order of admission as well as firing, an explosion and expansion chamber being formed in the main channel between each of the smaller channels and in each of the smaller channels when the latter are cut off by the passing of the large segments in the larger channel.

Taking the explosions in their order to show the operation of the engine, in Figs. 2 and 3 the port 45 in the disk 14 is admitting gas under pressure from the intake manifold 29, through port 41 to the charge pocket 36. Now turning the shaft contra-clockwise and in the direction indicated by the arrow in the main channel the piston 10 is advanced, the piston by its geared connections revolves the piston 31 in the direction indicated by the arrow or clockwise and the forward or leading end closes off the main channel at I between itself and the piston 10 and as the charge in the pocket 36 expands into this chamber it is ignited while still inclosed by a spark from the plug 79 connected to and timed by a suitable electrical apparatus.

The impulse forces the piston 10 onward opening the port 80 through which some of the ignited gas is forced and through the tube 81 to the port 82 to ignite and explode a charge of gas delivered from the pocket 17 in the piston 10, having been conveyed thereto by the registering of the port 20 in the disk 14 with the port 23, in the advance of the piston 10, the piston 30 having been forced by its geared connections to the shaft, to advance to open the main channel and allow the piston 10 to close off the main channel of II, to form an abutment for the explosion in the chamber formed by the walls of II the piston 30 and piston 10.

The advance of the piston 30 uncovers the port 83 and a portion of the ignited gas is forced through the tube 84 to the port 85, to ignite the charge delivered from the pocket 39 of the piston 34, this charge having been received through the registration of the port 47 in the disk and the port 44 in the casing 7.

This explosion at III gives an impulse to the piston 12 and the uncovering of the port 86 conveys a portion of the ignited gas to port 88 through pipe 87 to ignite the charge delivered to the pocket 19 through the registering of the ports 22 and 26.

The resultant explosion in chamber IV impels the piston 33 clockwise to uncover the port 89 and ignite the charge in chamber V through the tube 90 and port 91, this charge having been delivered from the pocket 37 in piston 32 and received from the source of supply through ports 42 and 46 as they registered.

The movement resultant from this combustion, moves piston 11 to uncover port 92 and carry the igniting medium to the port 94 through the channel formed by tube 93 to ignite the charge in combustion chamber VI obtained from pocket 18 and conveyed therein through registering ports 21 and 24, the position of the piston 31 at this time being just a trifle in advance of the position of piston 32 in Fig. 2. The progression of piston 31 in chamber VI, under the expansion, forces the burnt gases out through exhausts 51 and 56 and any pressure created by its further movement ahead tending to cause compression between it and piston 11 is carried by by-pass 61 which permits the escape of this pressure by connecting with the pocket 36, cleaning out this latter until it is shut off from the port 56 and receives gas by the registration first referred to of ports 41 and 45.

To clear the casing or the interior into which the port 56 and its companions empty, of burned gases and bring in fresh air as well as assisting in cooling the engine, openings are formed in each of the closures 8 and 9 and the disk is formed with the spokes 114 angled to form fan vanes to force air through the desired portion.

Continuing regarding the registration of ports 41 and 45, before this latter takes place again, the clockwise movement of piston 31 uncovers port 95, allowing ignited gas to jump through tube 96 to port 97 in VII and ignite charge in pocket 35, delivered thereto through ports 40 and 45, giving another impulse behind piston 10, uncovering port 98 and carrying ignition to port 100 to ignite charge in chamber VIII. This charge is delivered behind piston 34 and its action uncovers port 101 and delivers ignition to port 103 in IX and gives impulse to piston 12, the charge therefor having been carried by pocket 38 in piston 33 received through ports 47 and 43.

This impulse impels piston 12 past port 104, allowing ignition to take place in tube 105 and through port 106 to ignite charge in X delivered by pocket 19 behind piston 32, and obtained when port 22 passed port 25, and the resultant explosion forces piston 32 to uncover port 107 from which the burning gases are conveyed to a charge in chamber I, conveyed by pocket 36 behind piston 11, which has assumed the position of piston 10 on the initial explosion.

Thus in a revolution of the shaft and attached pistons and inlet disk through 120 degrees of arc or one third of the circumference or one complete revolution of the engine the ignition has been carried through a complete cycle with ten explosions, so that with a complete cycle of the main shaft there will be a total of thirty explosions or one for every twelve degrees of arc.

By pass 65 permits the relief of any pressure that would be caused in chamber I between the pistons 10 and 30, through the pocket 17, entirely scavenging the same and allowing the pressure to escape with the burnt gases in the chamber II through the port 50 acting as an exhaust.

Air is shown as entering the port 55 to cause no back pressure behind piston 30, the air liable to be compressed in front of piston 10, tending to reverse the current through 55 as soon as piston 30 opens up the main channel, and the bypass 65 cut off, the arrows in the ports showing the direction of the movement of the gases, those in the channels indicating the direction of movement of the pistons.

Having thus described my invention what I claim is—

1. A rotary engine comprising a casing provided with a plurality of intercrossing channels, and a plurality of pistons adapted to travel in said intercrossing channels, and adapted to segregate the same into explosion chambers, said pistons acting alternately as an abutment for an explosion chamber and as a piston to be impelled by an exploded charge.

2. In an internal combustion engine the combination of a casing having a plurality of intersecting channels, a plurality of pistons provided with charge receiving pockets, said pistons being adapted to travel in said channels and segregate the same into explosion chambers, means to introduce explosive charges into said charge receiving pockets and means to explode said charges.

3. In an internal combustion engine the combination of a casing provided with a plurality of intersecting channels, a plurality of charge carrying segments acting as pistons adapted to rotate and engage in said channels, means to control the movement of said segments to form chambers in said channels, adapted to receive an explosive mixture, means to introduce an explosive mixture to said segments adapted to carry a charge, and means to explode said mixture.

4. In an internal combustion engine the combination of a casing providing a channel and a series of intercrossing channels said channels opening at opposite sides of said casing, a plurality of pistons adapted to travel in said channels, means to connect certain of said pistons on one side of said casing, means to connect the other of said pistons on the opposite side of said casing, and a shaft common to both of said connecting means.

5. In an internal combustion engine the combination of a casing having a plurality of intercrossing channels opening at opposite sides thereof, a plurality of groups of pistons adapted to travel in said channels, means to connect a group of said pistons on one side of said casing, means to connect the other of said groups of pistons on the other side and a single shaft common to both of said connecting means.

6. In a rotary engine the combination of a casing having a plurality of intercrossing channels, a plurality of segments having pockets formed therein and coöperating with the adjacent wall of said channels to carry a charge of expandible fluid, means to control said segments to form expansion chambers in said channels, and means to introduce charges of expandible fluid to said pockets in said segments.

7. In an internal combustion engine the combination of a casing having a plurality of annular intercrossing channels, a plurality of segments having pockets formed therein and coöperating with the adjacent channel walls to carry a charge of expandible fluid, said segments acting as pistons and adapted to engage and rotate in said channels, means to regulate the movement of said segments to form explosion chambers in said channels intermediate a pair of said segments, and adapted to receive said charge in said pockets, means to introduce an expandible fluid to said pockets and means to expand said charges.

8. In an internal combustion rotary engine the combination of a casing provided with an annular channel opening on one side of said casing and a plurality of channels intersecting the first mentioned channel and opening on the opposite side of said casing, pistons adapted to travel in each of said channels, mountings for said pistons in said first channel on one side of said casing, mountings for the other of said pistons on the opposite side of said casing, ported closures for each of said mountings and a shaft common to both of said mountings.

9. In an internal combustion engine the combination of a casing providing a plurality of combustion chambers, and means to convey the ignited products from one of said chambers to a successively explosive charge, alternately to an adjacent and a non-adjacent combustion chamber.

ALEXANDER S. HARVEY.

Witnesses:
W. A. AMEND,
W. P. KEENE.